United States Patent [19]
Shin

[11] Patent Number: 6,108,044
[45] Date of Patent: Aug. 22, 2000

[54] RECEIVER FOR RECEIVING BOTH HDTV AND NTSC AND METHOD FOR SELECTING RECEIVED SIGNALS

[75] Inventor: Hyun-soo Shin, Suwon, Rep. of Korea

[73] Assignee: Samsung Electronics Co., Ltd., Kyungki-do, Rep. of Korea

[21] Appl. No.: 09/058,253

[22] Filed: Apr. 10, 1998

[30] Foreign Application Priority Data

Apr. 10, 1997 [KR] Rep. of Korea ...................... 97-13217

[51] Int. Cl.[7] ...................................................... H04N 5/46
[52] U.S. Cl. ........................................... 348/555; 348/556
[58] Field of Search ...................................... 348/555, 556, 348/554, 570, 731, 732, 21, 726, 607; 455/186.1, 186.2; H04N 5/260, 5/265, 5/46

[56] References Cited

U.S. PATENT DOCUMENTS 5,282,023  1/1994  Scarpa ..................................... 348/727
5,283,653  2/1994  Citta ........................................ 348/725

FOREIGN PATENT DOCUMENTS 94-10765  5/1994  Rep. of Korea ................. H04N 7/00
95-30649  11/1995  Rep. of Korea ................. H04N 7/12

*Primary Examiner*—Michael H. Lee
*Attorney, Agent, or Firm*—Sughrue, Mion, Zinn, Macpeak & Seas, PLLC

[57] ABSTRACT

A receiver which receives both HDTV and NTSC signals, and a method for selecting received signals, are provided. According to this receiver and method, a broadcasting mode and a channel mode are set by the user. When the broadcasting mode is set to be an NTSC mode, only an NTSC signal is selected to be displayed. When the broadcasting mode is set to be an HDTV mode, only a high-definition (ATV) signal is selected to be displayed. When the judged broadcasting mode is an automatic mode, a judgement is made by the receiver whether an NTSC signal exists in a received signal. If no NTSC signal is present in the received signal, the ATV signal is selected for display. If the NTSC signal exists in the currently-received signal, selection between NTSC and ATV signals is made based on the channel mode set by the user. If the channel mode is set to NTSC, then the NTSC signal is selected for display. If the channel mode is set to HDTV, then the ATV signal is selected for display. Therefore, the HDTV and NTSC signals can both be received, and when both NTSC and HDTV signals exist in a channel, one of them can be selectively received.

11 Claims, 4 Drawing Sheets

RECEIVER FOR RECEIVING BOTH HDTV AND NTSC AND METHOD FOR SELECTING RECEIVED SIGNALS

BACKGROUND OF THE INVENTION

1. Field of the Invention

The present invention relates to a television receiver, and more particularly, to a receiver for receiving both HDTV and NTSC signals, and a method for selectively receiving either HDTV or NTSC signal.

2. Description of Related Art

The "Grand Alliance" Advanced Television system (GA-ATV) is a digital television transmission system standard which can replace NTSC. The GA-ATV system (also called GA-HDTV or GA-VSB) is standardized by an advanced television system committee (ATSC) and adopts a vestigial side band (VSB) modulation method of digital transmission.

A new ATV signal is transmitted simultaneously with a conventional analog television broadcasting signal (NTSC) via a TV channel which is presently not used in a given geographic region (called a "taboo" channel). Thus, the GA-VSB receiver must be designed to resist interference from the NTSC signal.

The GA-VSB receiver corresponding to a USA-type terrestrial broadcasting HDTV standard is disclosed in the following reference: [1] ATSC Digital Television Standard, September., 1995. FIG. 1 shows the configuration of the above-described GA-VSB receiver.

Referring to FIG. 1, the receiver is comprised generally of a tuner 102, a demodulator 104, an NTSC interference canceler 106, a signal processor 108, and a display 110. The tuner 102 receives an HDTV signal transmitted from a transmitter. The demodulator 104 demodulates the output of the tuner 102. The NTSC interference canceler 106 cancels a modulation carrier of an NTSC signal existing in the output of the demodulator 104. The signal processor 108 equalizes the output of the NTSC interference canceler 106, corrects errors in the equalized signal and restores the error-corrected signal to an image signal. The display 110 displays the output of the signal processor 108.

In the event HDTV broadcasting starts, a couple of problems must be dealt with. First, coexistence with NTSC broadcasting cannot be avoided, and a receiver must be structured to allow viewers to watch either HDTV or NTSC broadcasting at will. Second, a channel may be an NTSC broadcasting channel or a HDTV broadcasting channel depending on geographic location. Thus, since in practice a channel may have both the NTSC and HDTV signals, a structure whereby either of the two broadcastings can be watched is required. However, the conventional GA-VSB receiver shown in FIG. 1 has a structure allowing viewers to watch only HDTV broadcasting.

SUMMARY OF THE INVENTION

An object of the present invention is to provide a receiver for receiving both NTSC and HDTV signals.

Another object of the present invention is to provide a method for selectively receiving either an NTSC or HDTV signal.

Still another object of the present invention is to provide a method for selectively receiving either an NTSC or HDTV signal when both the NTSC and the HDTV signals exist in a channel.

To accomplish the first object, a tuner of the present invention receives a high-definition signal having a digital format and an normal signal having an analog format. A first demodulator demodulates the high-definition signal output by the tuner and outputs a demodulated high-definition signal. A detector detects whether the normal signal exists in the demodulated high-definition signal and thus generates a detection signal, and removes the normal signal. A first signal processor processes the high-definition signal output by the detector, restores the high-definition signal to an image signal, and outputs a high-definition image signal. A second demodulator demodulates the normal signal output from the tuner and outputs a demodulated normal signal. A second signal processor processes the demodulated normal signal and outputs a corresponding image signal.

A controller determines the detection signal, and a broadcasting mode signal and a channel mode signal which are input from the outside, and generates a selection signal. A selector outputs either the high-definition image signal or the normal image signal according to the selection signal. Here, the high-definition signal is an ATV signal and the normal signal is an analog NTSC signal. The broadcasting mode signal can indicate at least an HDTV mode, an NTSC mode and an automatic mode. The controller generates a selection signal to control the selector to select the ATV image signal when the channel mode signal indicates an HDTV channel, and to select the NTSC image signal when the channel mode signal indicates an NTSC channel, according to a detection signal indicating that an NTSC signal exists in the ATV signal.

To accomplish the second and third objects, there is provided a method of selecting a received signal. One step of the method is to determine a broadcasting mode, which is set from the outside, and selecting the normal signal when the broadcasting mode is determined as a first mode, selecting the high-definition signal when the broadcasting mode is determined as a second mode. Another step of the method is to determine whether a normal signal exists in a received signal when the broadcasting mode is determined as a third mode, in order to simultaneously receive a high-definition signal having a digital format and a normal signal having an analog format.

Also, the receiving method of the present invention includes the steps of:

receiving the high-definition signal when no normal signal exists in the received signal;

determining a channel set from the outside when a normal signal exists in the received signal;

selecting the normal signal when the determined channel is a normal channel; and selecting the high-definition signal when the determined channel is a high-definition channel.

Here, the high-definition signal is an ATV signal and the normal signal is an NTSC signal. The first mode corresponds to an HDTV mode and the second mode corresponds to an NTSC mode. The third mode is an automatic mode.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
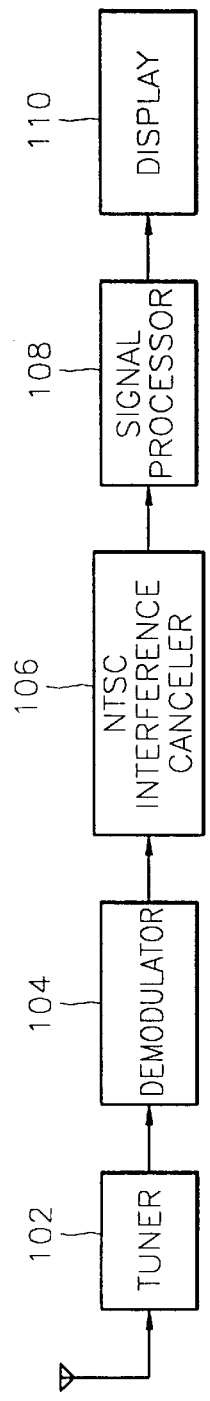
FIG. 1 is a block diagram of a conventional GA-VSB receiver.
Figure 2:
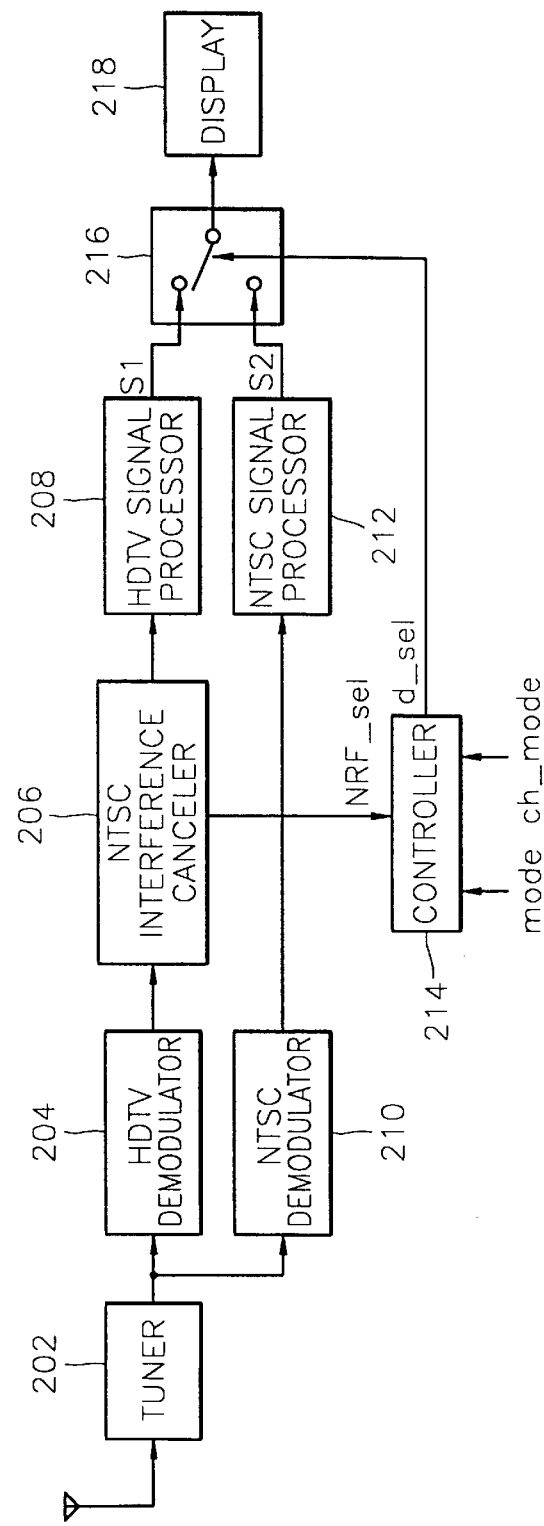
FIG. 2 is a block diagram of a receiver for receiving both of HDTV and NTSC according to an embodiment of the present invention.

Referring to FIG. 2, a tuner 202 receives NTSC and HDTV signals simultaneously. That is, the tuner 202 is structured so that it can receive all of the NTSC and HDTV signals.

An HDTV demodulator 204 demodulates an HDTV signal in the signal output by the tuner 202. An NTSC interference canceler 206 cancels the modulation carrier of the NTSC signal existing in the output of the HDTV demodulator 204, and outputs a detection signal (NRF_sel) indicating whether the NTSC signal exists in the HDTV signal. An HDTV signal processor 208 equalizes the output of the NTSC interference canceler 206, corrects errors in the equalized signal, and restores the error-corrected signal to an image signal.

An NTSC demodulator 210 demodulates the NTSC signal in the signal output by the tuner 202. An NTSC signal processor 212 processes the demodulated NTSC signal and outputs the processed NTSC signal.

A controller 214 recognizes the detection signal (NRF_sel) which is output by the NTSC interference canceler 206, as well as a broadcasting mode signal (mode) and a channel mode signal (ch_mode) which are set by a user, and generates a selection signal (d_sel). A selector 216 selects either the restored HDTV signal (S1) or the processed NTSC signal (S2) according to the selection signal (d_sel) generated by the controller 214, and supplies the selected signal to a display 218.

Figure 3:
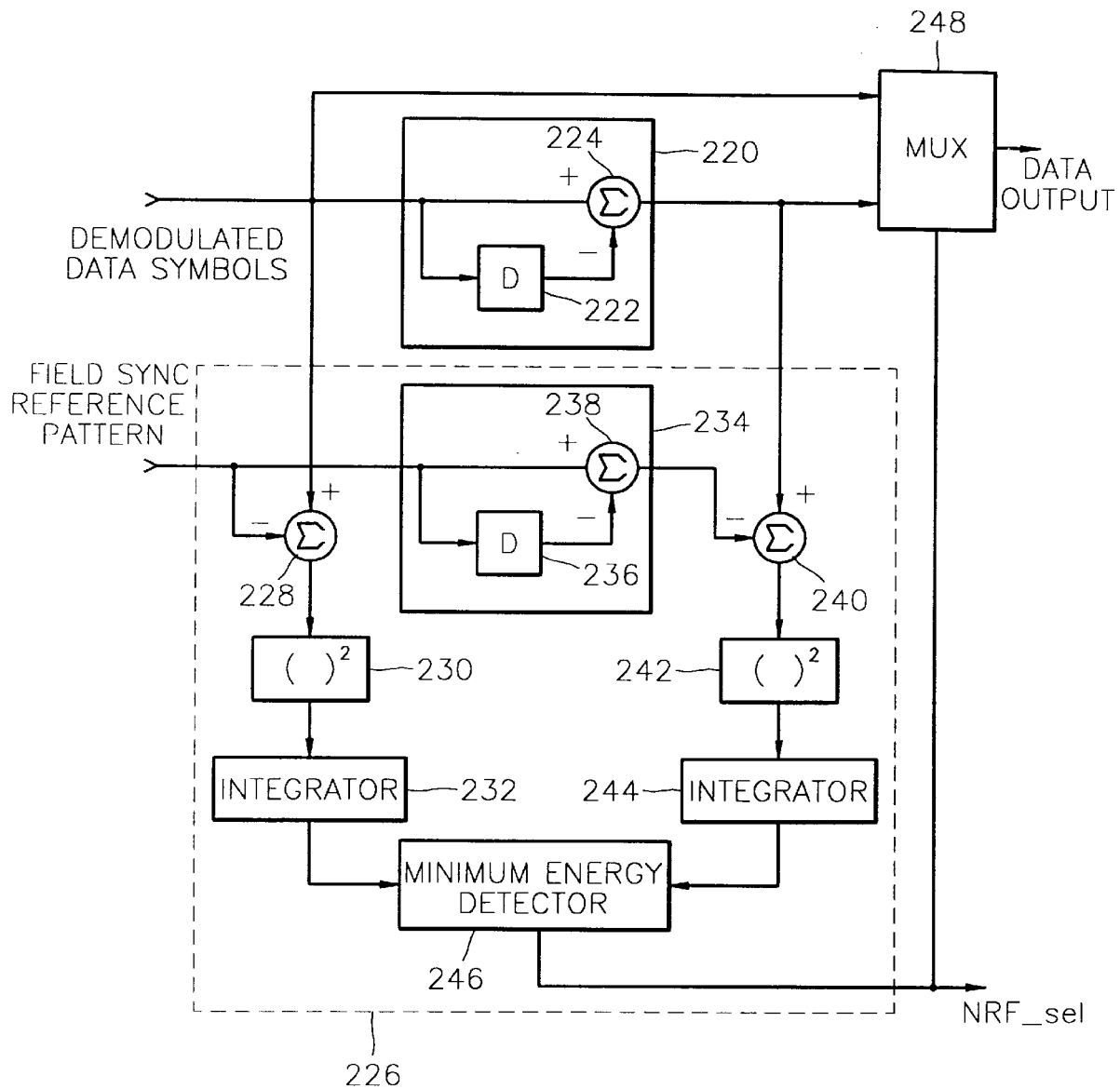
FIG. 3 is a detailed block diagram of an NTSC interference canceler shown in FIG. 2.

FIG. 3 shows the NTSC interference canceler 206 in detail. Referring to FIG. 3, the NTSC interference canceler 206 is comprised of a comb filter 220, an NTSC interference detector 226, and a selector (MUX) 248.

In a co-channel, where the HDTV and NTSC signals are simultaneously broadcasted, the NTSC signal has a predetermined carrier frequency offset (about 0.89 MHz) from the HDTV signal. Almost all the energy of the NTSC signal is concentrated in an original DC component, i.e., the modulation carriers. Thus, a subtractor 224 of the comb filter 220 subtracts from the input symbols delayed input symbols which have been delayed for 12 symbol periods by means of a 12 symbol delay 222, thereby removing modulation carriers of the NTSC signal.

Figure 4:
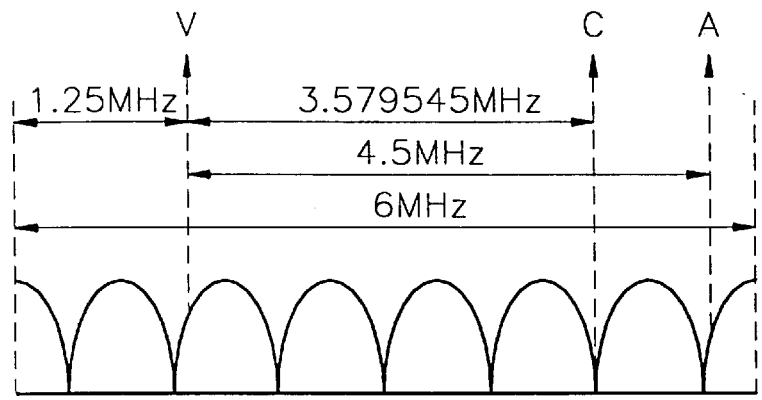
FIG. 4 shows the frequency characteristics of an NTSC interference rejection filter shown in FIG. 3.

The comb filter 220 has several frequency notches in a band of a 6 MHz HDTV signal as shown in FIG. 4. Since the modulation carriers, that is a visual carrier, a chrominance subcarrier and an aural carrier, are located near the frequency notches of the comb filter 220, the energy of the NTSC signal passed through the comb filter 220 is significantly reduced. Thus, the comb filter 220 can effectively remove the NTSC signal despite its simple structure.

Meanwhile, the NTSC interference detector 226 compares a pre-stored field synchronization (called "sync") reference pattern with a field sync among demodulated data symbols output from the HDTV demodulator 204 shown in FIG. 2, and uses an accumulation value of the square of the difference therebetween, i.e., energy, to determine whether an NTSC signal exists in the HDTV signal.

Figure 5:
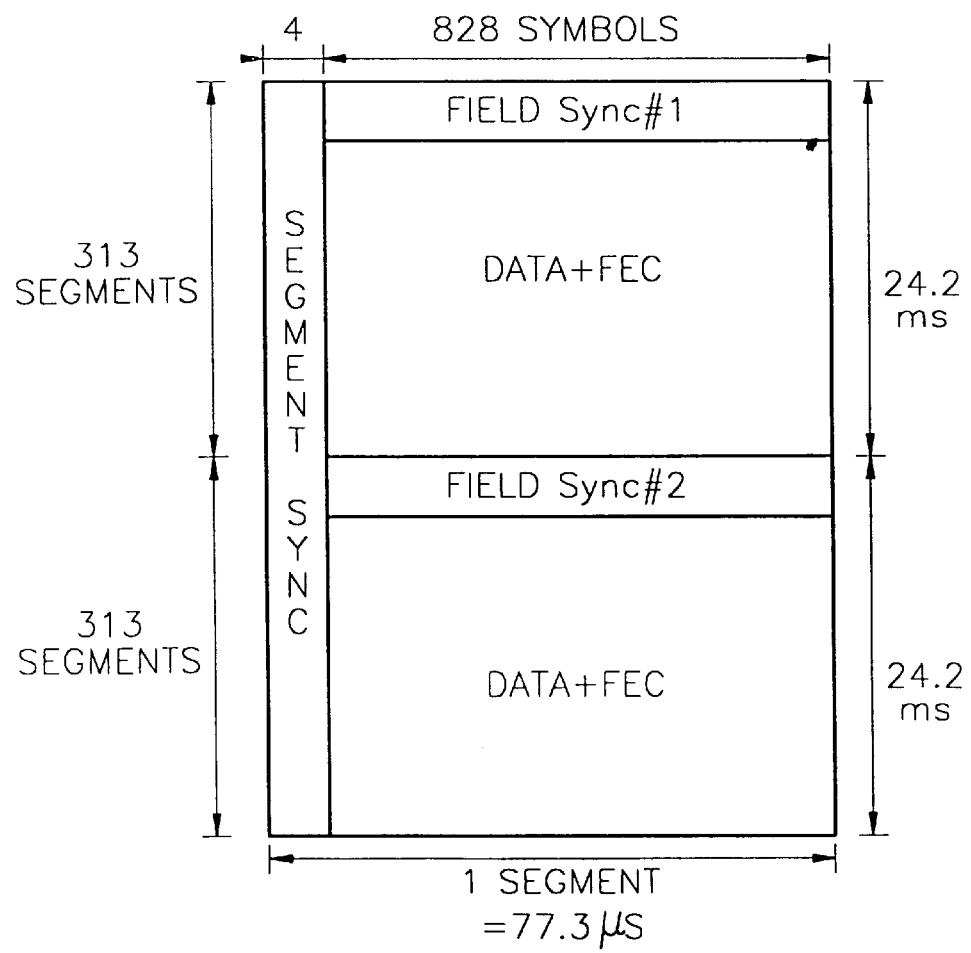
FIG. 5 shows a format of a VSB transmission frame.

Here, the format of a received VSB data frame is shown in FIG. 5. The VSB data frame is comprised of two fields. Each field is comprised of one field sync segment and 312 data segments each including four symbols of segment sync and 828 data symbols. The segment sync is inserted into an 8-level digital data stream at the beginning of the field sync segment and each of the data segments. Each of the four symbols of the segment sync has a predetermined pattern having a "+5,−5,−5,+5" signal level, and residual data of the data segments is randomly comprised of arbitrary signal levels from 8 levels (±1,±3,±5,±7). In FIG. 5, FEC denotes forward error correction. Field sync signal sequence (FIELD SYNC #1 or FIELD SYNC #2) representing the start of a field is inserted into a field sync segment being the first segment of each field. The field sync signal sequence has a regular form.

The NTSC interference detector 226 includes units 228, 230 and 232 forming a first path where a field sync reference pattern is compared with a field sync received without passing through the comb filters 220 and 234, and an accumulation value (energy) of the square of the difference therebetween is calculated. Units 234, 240, 242 and 244 of the NTSC interference detector 226 form a second path where a field sync filtered by the comb filter 220 is compared with a field sync reference pattern filtered by the comb filter 234, and an accumulation value (energy) of the square of the difference therebetween is calculated.

The NTSC interference detector 226 also has a minimum energy detector 246 for comparing the values along the two paths to select the path having a smaller energy and outputting a detection signal (NRF_sel) indicating whether an NTSC signal exists in the HDTV signal. That is, if an NTSC signal is present, the energy of the second path passed through the comb filters 220 and 234 will be smaller; otherwise, the energy of the first path which does not pass through the comb filters 220 and 234 will be smaller. The NRF_sel signal represents the presence or absence of the NTSC signal, and is logic "1" when the NTSC signal exists and logic "0" when the NTSC signal does not exist.

The selector 248 selects either the demodulated data symbols output from the HDTV demodulator 204 or the demodulated data symbols passed through the comb filter 220, according to the detection signal (NRF_sel), and outputs the selected symbols to the HDTV signal processor 208 shown in FIG. 2.

Figure 6:
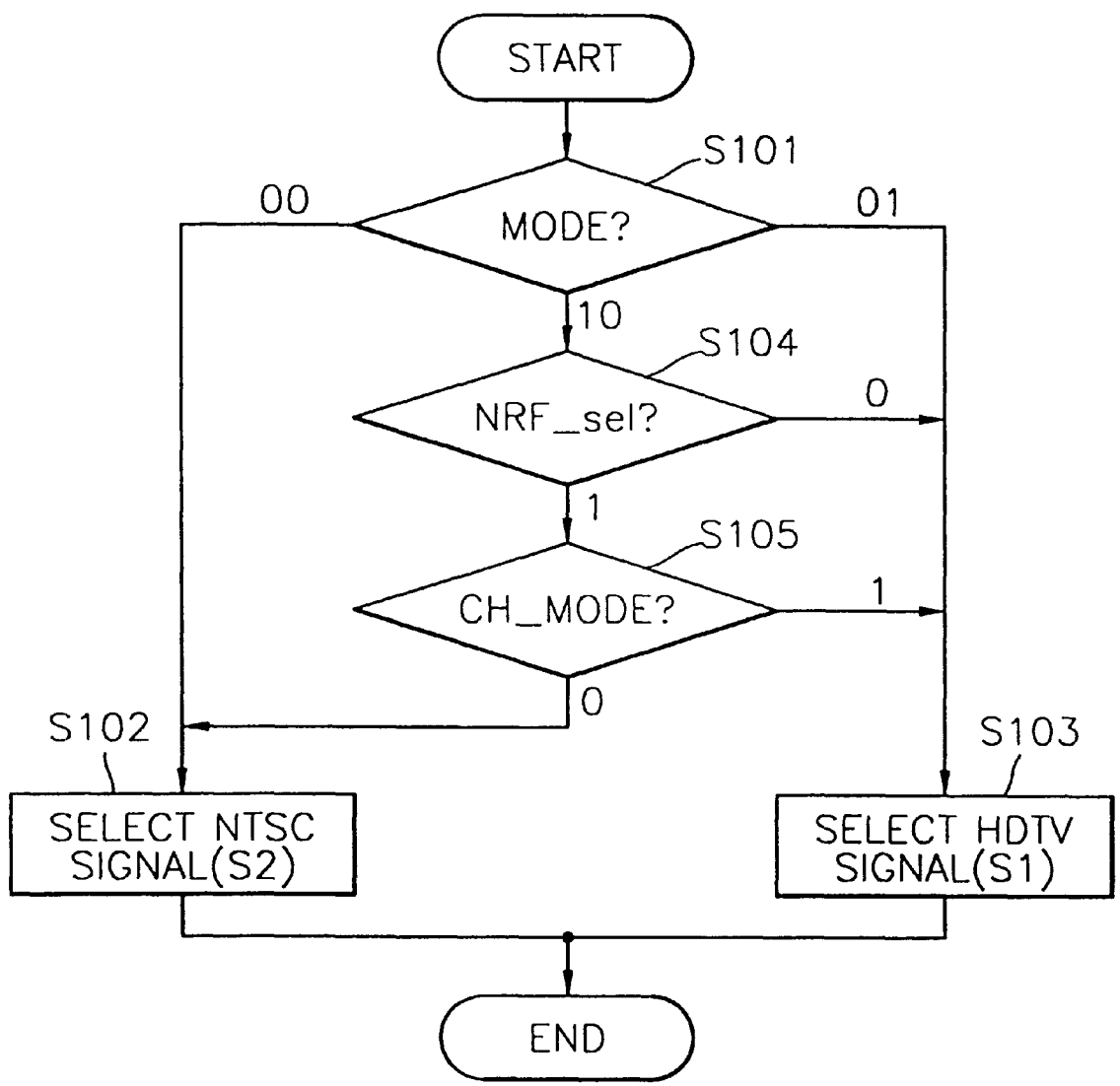
FIG. 6 is a flow chart outlining the operation of a controller shown in FIG. 2 for selecting received signals.

FIG. 6 is a flow chart illustrating the signal selecting operation performed by the controller 214 shown in FIG. 2. The operations of FIG. 6 will be described with reference to FIG. 2. Referring to FIG. 6, the controller 214 receives an external signal to select an HDTV mode, an NTSC mode or an automatic mode. This external signal is a broadcasting mode signal (mode). For example, when the value of the mode is "00", the NTSC mode is selected, when "01", the HDTV mode is selected, and when "10", the automatic mode is selected.

When the broadcasting mode signal (mode) received from the outside is "00" in step S101, the controller 214 recognizes the NTSC mode and applies the selection signal (d_sel) to the selector 216, and then the selector 216 always selects the processed NTSC signal (S2) output by the NTSC signal processor 212, in step S102. Thereby, viewers can watch an NTSC format broadcast on the display 218.

When the broadcasting mode signal (mode) is "01" in step S101, the controller 214 recognizes the HDTV mode and applies the selection signal (d_sel) to the selector 216, and the selector 216 always selects the restored HDTV signal (S1) output from the HDTV signal processor 208, in step S103. Thereby, viewers can watch an HDTV format broadcast on the display 218.

When the broadcasting mode signal (mode) is "10" in step S101, the controller 214 recognizes the automatic mode and determines the detection signal (NRF_sel) detected by the NTSC interference canceler 206, in step 104. When the detection signal (NRF_sel) is logic "0" (i.e., when the NTSC signal does not exist) the step S103 described above is performed. That is, the controller 214 applies the selection signal (d_sel) to the selector 216, and the selector 216 always selects the restored HDTV signal (S1) output from the HDTV signal processor 208, whereby viewers can watch the HDTV format broadcast on the display 218.

When the detection signal (NRF_sel) is logic "1" in step S104 (i.e., when it is determined that the NTSC signal exists) either the NTSC or HDTV broadcasting is selected according to a channel mode signal (ch_mode) set by a user, in step S105. That is, when it is determined that the NTSC signal exists in step S104, the channel mode signal (ch_mode) is then determined in step S105 to find out whether the existing NTSC signal should be treated as a signal because the NTSC channel is selected, or treated as interference because an HDTV channel is selected.

When the channel mode signal (ch_mode) is logic "0", it means that the NTSC channel is selected. Thus, the procedure returns to the step S102, and the controller 214 applies the selection signal (d_sel) to the selector 216, and the selector 216 always selects the NTSC signal (S2) processed by the NTSC signal processor 212, whereby viewers can watch the NTSC format broadcast on the display 218.

When the channel mode signal (ch_mode) is logic "1" in step S105, it means that the HDTV channel is selected meaning that an NTSC signal existing in the HDTV channel is to be treated as interference. Thus, the procedure returns to the step S103, and the controller 214 applies the selection signal (d_sel) to the selector 216, and the selector 216 always selects the HDTV signal (S1) processed by the HDTV signal processor 208, whereby viewers can watch the HDTV format broadcast on the display 218.

As described above, the present invention can receive both NTSC and HDTV signals, and selectively receive one or the other when both NTSC and HDTV broadcasting exist in a channel.

Although the present invention has been described in terms of a preferred embodiment, it will be appreciated that various modifications may be made to the described embodiment without departing from the spirit and scope of the invention. This application for a receiver for receiving both HDTV and NTSC signals and a method for selecting received signals is based on Korean Patent Application No. 97-13217, which is incorporated by reference herein for all purposes.

What is claimed is:

1. A receiver comprising:
   a tuner which receives a high-definition signal having a digital format and a normal signal having an analog format;
   a first demodulator which demodulates said high-definition signal output by said tuner and outputs a demodulated high-definition signal;
   a detector which detects whether said normal signal exists in said demodulated high-definition signal to generate a detection signal, and which removes said normal signal;
   a first signal processor which processes said high-definition signal output by said detector and restores said high-definition signal to an image signal, which is output as a high-definition image signal;
   a second demodulator which demodulates said normal signal output from said tuner and outputs a demodulated normal signal;
   a second signal processor which processes said demodulated normal signal and outputs a normal image signal;
   a controller which receives said detection signal, as well as a broadcasting mode signal input by a user and a channel mode signal input by a user, and generates a selection signal; and
   a selector which outputs either said high-definition image signal or said normal image signal according to said selection signal.

2. The receiver as claimed in claim 1, wherein said high-definition signal is an ATV signal and said normal signal is an NTSC signal.

3. The receiver as claimed in claim 2, wherein said broadcasting mode signal can indicate at least an HDTV mode, an NTSC mode, and an automatic mode.

4. The receiver as claimed in claim 1, wherein said controller generates a selection signal to control said selector to select said high-definition image signal when said channel mode signal indicates an HDTV channel, and to select said normal image signal when said channel mode signal indicates an NTSC channel, when said detection signal indicates that said normal signal exists in said demodulated high-definition signal.

5. A receiver which receives both HDTV and NTSC broadcasts, the receiver comprising:
   a tuner which simultaneously receives an NTSC signal and an HDTV signal;
   an HDTV demodulator which demodulates said HDTV signal output by said tuner and outputs a demodulated HDTV signal;
   an NTSC interference canceler which cancels modulation carriers of said NTSC signal from said demodulated HDTV signal, and generates a detection signal indicating whether said NTSC signal exists in said HDTV signal;
   an HDTV signal processor which equalizes an output of said NTSC interference canceler, corrects errors in an equalized signal, and restores an error-corrected signal to an image signal which is output as an HDTV image signal;
   an NTSC demodulator which demodulates said NTSC signal output from said tuner and outputs a demodulated NTSC signal;
   an NTSC signal processor which processes said demodulated NTSC signal and outputs an NTSC image signal;
   a controller which receives said detection signal, as well as a broadcasting mode signal input by a user and a channel mode signal input by a user, and generates a selection signal; and
   a selector which outputs either said HDTV image signal or said NTSC image signal according to said selection signal.

6. The receiver as claimed in claim 5, wherein said broadcasting mode signal can indicate at least an HDTV mode, an NTSC mode, and an automatic mode.

7. The receiver as claimed in claim 5, wherein said controller generates a selection signal to control said selector to select said HDTV image signal when said channel mode signal indicates an HDTV channel, and to select said NTSC image signal when said channel mode signal indicates an NTSC channel, when said detection signal indicates that said NTSC signal exists in said HDTV signal.

8. A method of selecting either a high-definition signal having a digital format or a normal signal having an analog format which are received simultaneously, said method comprising the steps of:

(a) determining a broadcasting mode set by a user;

(b) selecting said normal signal when said broadcasting mode is determined as a first mode, selecting said high-definition signal when said broadcasting mode is determined as a second mode, and determining whether a normal signal exists in a received signal when said broadcasting mode is determined as a third mode;

(c) when said broadcasting mode is determined as a third mode in said step (b), receiving said high-definition signal if it is determined that no normal signal exists in said received signal and determining a channel mode set by a user if it is determined that a normal signal exists in said received signal; and (d) when it is determined in said step (c) that a normal signal exists in said received signal, selecting said normal signal when the channel mode is determined to be a normal channel, and selecting said high-definition signal when the channel mode is determined to be a high-definition channel.

9. The method as claimed in claim 8, wherein said high-definition signal is an ATV signal and said normal signal is an NTSC signal.

10. The method as claimed in claim 9, wherein said first mode is an HDTV mode, said second mode is an NTSC mode, and said third mode is an automatic mode.

11. A method of selectively receiving signals for use in a receiver which generates an NTSC detection signal indicating whether an NTSC signal exists in an HDTV signal and can receive both said HDTV and NTSC signals, said method comprising the steps of:

(a) receiving said HDTV and NTSC signals;

(b) selecting said HDTV signal when a broadcasting mode set by a user is an HDTV mode, selecting said NTSC signal when said broadcasting mode is an NTSC mode, and determining said NTSC detection signal when said broadcasting mode is an automatic mode;

(c) when said broadcasting mode is an automatic mode, selecting said HDTV signal when said NTSC detection signal indicates that said NTSC signal does not exist in said received signal, and determining a channel mode set by a user when said NTSC detection signal indicates that said NTSC signal exists in said received signal; and (d) when said NTSC detection signal indicates in said step (c) that said NTSC signal exists in said received signal, selecting said HDTV signal when said channel mode is determined to be an HDTV channel mode, and selecting said NTSC signal when said channel mode is determined to be an NTSC channel mode.

* * * * *